(12) United States Patent
Jackson

(10) Patent No.: US 9,061,228 B2
(45) Date of Patent: Jun. 23, 2015

(54) FILTER ASSEMBLY, AND PRE-FILTER DEVICE AND PRE-FILTER MOUNTING PLATE THEREFOR

(75) Inventor: Paul Jackson, Tyne & Wear (GB)

(73) Assignee: AAF LTD., Northumberland (GB)

( * ) Notice: Subject to any disclaimer, the term of this patent is extended or adjusted under 35 U.S.C. 154(b) by 178 days.

(21) Appl. No.: 13/825,731

(22) PCT Filed: Sep. 15, 2011

(86) PCT No.: PCT/EP2011/066002
§ 371 (c)(1),
(2), (4) Date: Jun. 4, 2013

(87) PCT Pub. No.: WO2012/038317
PCT Pub. Date: Mar. 29, 2012

(65) Prior Publication Data
US 2014/0130468 A1    May 15, 2014

(30) Foreign Application Priority Data
Sep. 24, 2010    (GB) .................................. 1016164.4

(51) Int. Cl.
*B01D 46/00* (2006.01)
*F02C 7/055* (2006.01)
(Continued)

(52) U.S. Cl.
CPC ........ *B01D 46/0005* (2013.01); *B01D 2279/60* (2013.01); *B01D 46/002* (2013.01);
(Continued)

(58) Field of Classification Search
CPC ........... B01D 46/0005; B01D 46/0013; B01D 46/002; B01D 46/0023; B01D 46/02; B01D 46/2414; B01D 2265/027; B01D 2265/028; B01D 2267/30; B01D 2279/60; F02C 7/05; F02C 7/052; F02C 7/055
USPC ........................... 55/482, 484, 486, 487, 490
See application file for complete search history.

(56) References Cited

U.S. PATENT DOCUMENTS 5,092,993 A    3/1992   Goodwin
5,223,011 A    6/1993   Hanni
(Continued)

FOREIGN PATENT DOCUMENTS

EP    2 218 490 A1    8/2010

OTHER PUBLICATIONS

European Patent Office—International Searching Authority, Notification of Transmittal of the International Search Report and the Written Opinion of the International Searching Authority, or the Declaration for International Application for No. PCT/EP2011/066002, mailed Oct. 27, 2011, 13 pages.
(Continued)

*Primary Examiner* — Robert Clemente
(74) *Attorney, Agent, or Firm* — Haynes and Boone, LLP

(57) ABSTRACT

A filter assembly (6) comprises a mounting support (11) defining a fluid outlet opening in the support, a filter device (9) extending across the opening, a fastening arrangement (12) operative to locate the filter device against a seat (11*a*) of the mounting support (11) so that the filter device (9) extends across the opening for filtering a fluid medium flowing through the outlet opening and the filter device (9), and a pre-filter device (8) secured, between the fastening arrangement (12) and the filter device (9), for pre-filtering fluid medium flowing successively through the upstream pre-filter (8) and downstream filter device (9). The pre-filter device (8) comprises a filter mounting plate (15) located upstream of the filter device (9) and held there by the fastening arrangement (12), relative to the fluid flow direction, and at least one filter element (16) removably mounted on the mounting plate (15).

18 Claims, 13 Drawing Sheets

(51) Int. Cl.
    *B01D 46/02* (2006.01)
    *F02C 7/05* (2006.01)

(52) U.S. Cl.
    CPC .......... *F02C 7/055* (2013.01); *B01D 2265/027* (2013.01); *B01D 46/0023* (2013.01); *B01D 46/02* (2013.01); *B01D 2265/028* (2013.01); *F02C 7/05* (2013.01)

(56) References Cited

U.S. PATENT DOCUMENTS

| | | | |
|---|---|---|---|
| 5,512,074 | A | 4/1996 | Hanni et al. |
| 5,972,063 | A | 10/1999 | Dudrey et al. |
| 6,099,612 | A | 8/2000 | Bartos |
| 6,319,307 | B1 | 11/2001 | Shanks et al. |
| 6,676,722 | B1 * | 1/2004 | Clements et al. ............... 55/378 |
| 2003/0177755 | A1 | 9/2003 | Shingu et al. |
| 2005/0050868 | A1 | 3/2005 | Bugli et al. |
| 2005/0204713 | A1 | 9/2005 | Wu et al. |
| 2006/0207233 | A1 | 9/2006 | Hord et al. |
| 2010/0192528 | A1 * | 8/2010 | Mann et al. ..................... 55/483 |

OTHER PUBLICATIONS

UK Intellectual Property Office—Search Report for Application No. GB1016164.4, dated Jan. 24, 2011, 2 pages.

* cited by examiner

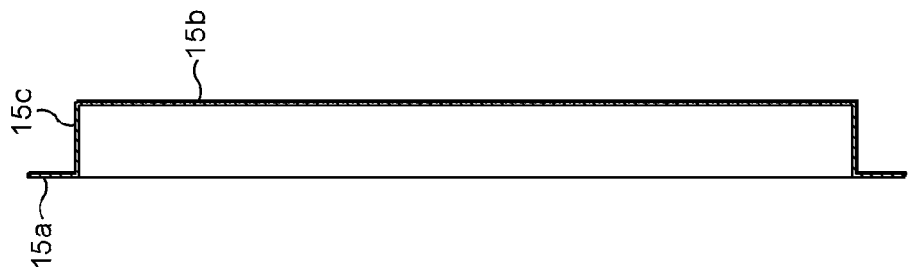
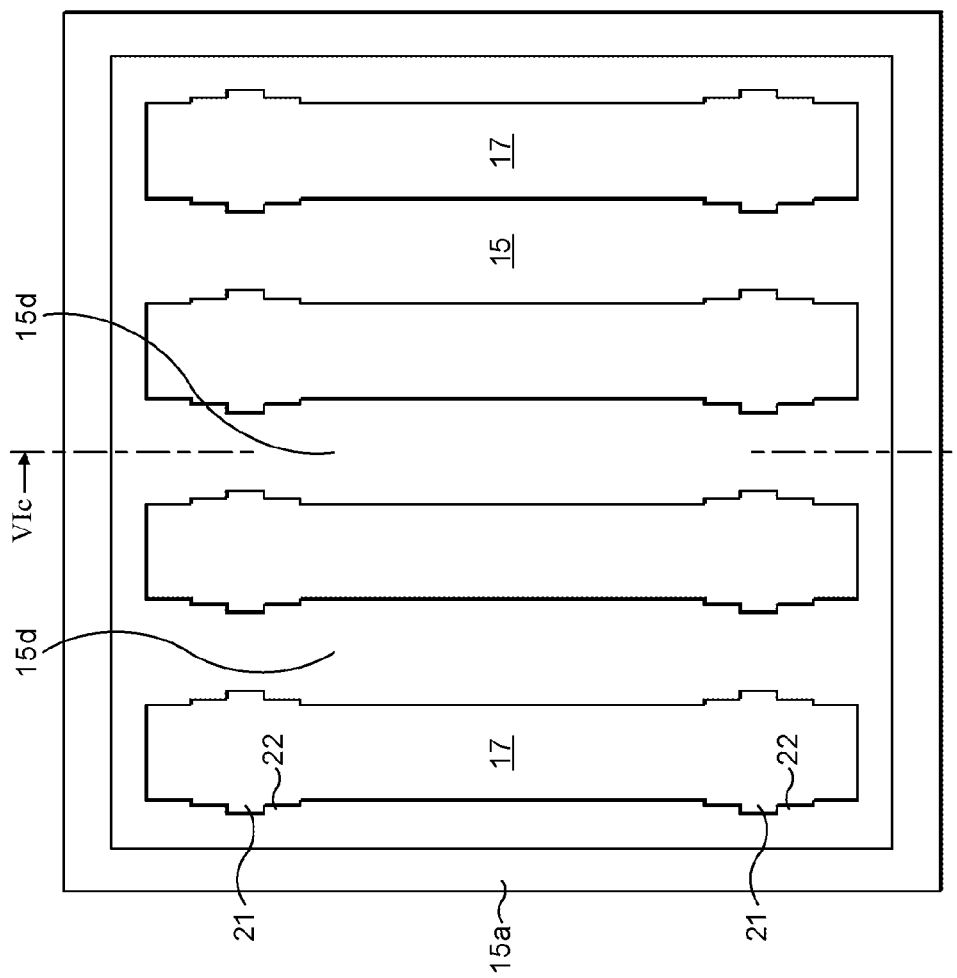

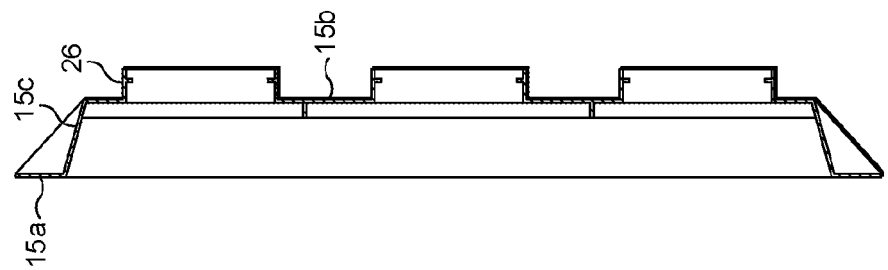
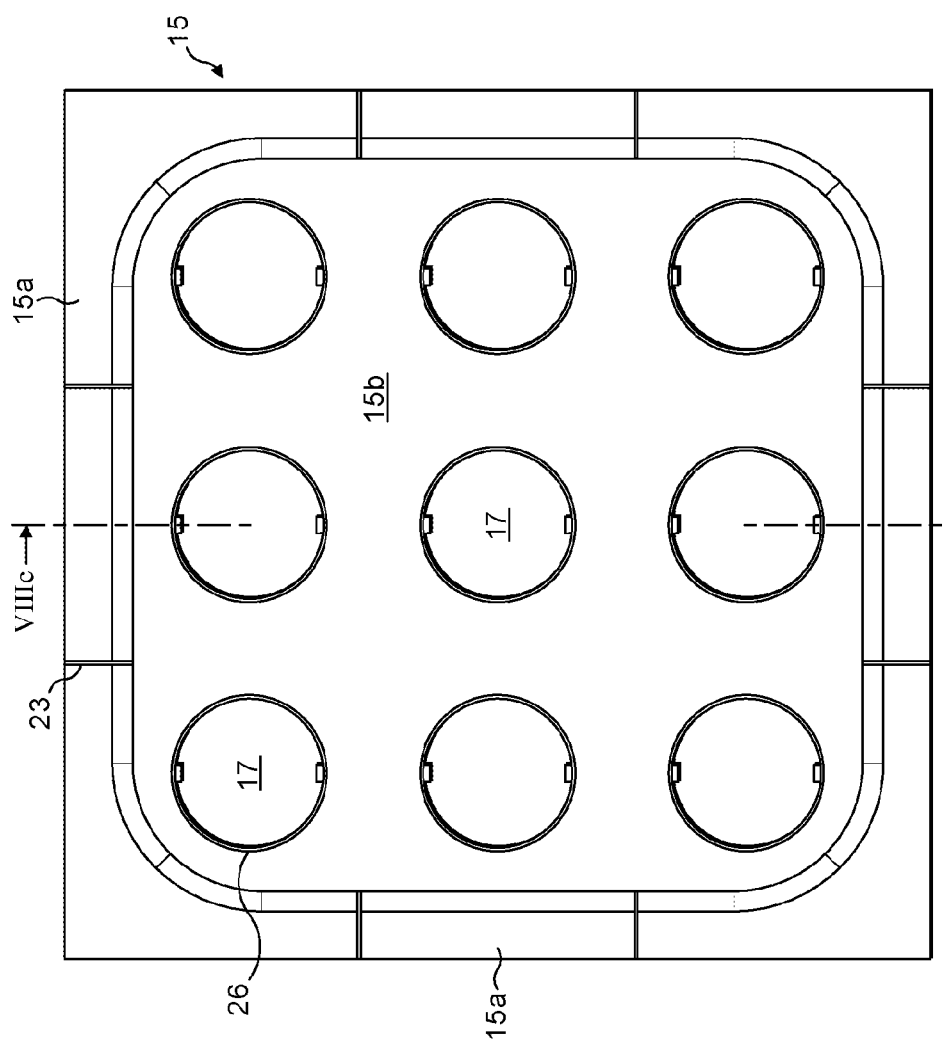

FILTER ASSEMBLY, AND PRE-FILTER DEVICE AND PRE-FILTER MOUNTING PLATE THEREFOR

CROSS REFERENCE TO RELATED APPLICATIONS

This application is a United States national phase of co-pending international patent application No. PCT/EP2011/066002, filed Sep. 15, 2011, which claims priority to Great Britain application No. GB1016164.4, filed Sep. 24, 2010, the disclosures of which are incorporated herein by reference.

BACKGROUND

The present invention relates to a filter assembly, as well as a pre-filter device and a pre-filter mounting plate therefor, in particular, but not exclusively, for use in filtering intake air for gas turbines.

It is essential to correctly filter intake air to a gas turbine used for power generation purposes. In particular, because of the large volume of air drawn into the combustion system of such a gas turbine, filtration of the air is necessary to prevent fouling and/or erosion of the axial compressor blades of the turbine, as well as preventing corrosion within the low and high temperature gas path areas. For example, intake of coarse mineral dust may erode the rotor and/or stator blades of the turbine compressor, and fine sticky carbon smoke dust could create deposits on the blades. In both cases, the profile of the blade is changed from that designed for optimum operation, as a result of which turbine efficiency and power output is lost.

To avoid this problem, a gas turbine will generally have a filter section appropriate for the expected dust concentration in the area of an installation, as well as the expected climatic conditions and space limitations. A standard gas turbine filtration system can employ four or more stages of filter elements, each stage being selected to be progressively more efficient as the ambient air is drawn closer to the gas turbine intake. The final filtration stage is selected in accordance with specified gas turbine requirements. For example, one filter element per stage is normally required for every 2500 cubic feet per minute of turbine combustion intake air. This can mean that an intake filter housing can employ multiple stages of filters, with each stage holding anywhere between 12 and more than 700 elements.

A known gas turbine 1 of this type is shown in the schematic side view of FIG. 1 of the accompanying drawings. The gas turbine 1 has rotor blades 2 which are caused to rotate within a combustion part 3 of the turbine powered by gas from a fuel supply 4, so as to output electrical power at an output line (not shown). Air input to the combustion part 3 passes initially into an inlet duct 5 and then through a matrix of filter assemblies 6 in the inlet duct, so that dirt and other particulate matter contained in the air entering inlet duct 12 is prevented from reaching turbine blade 2. The cleaned air flow then passes via air transition duct 7, to the gas turbine air intake.

FIG. 2 is a diagrammatic longitudinal section, seen from the side, of a single filter assembly 6 of the gas turbine assembly of FIG. 1, shown in more detail.

The filter assembly 6 is a two-stage filter comprising an upstream, relatively coarse, pre-filter device 8 and a downstream, relatively fine, final filter device 9, which removes finer particulates that have passed through the pre-filter device 8. The air flow direction is indicated by the solid arrow in the Figure.

The final filter device 9 comprises a body part 10 that is of generally square external profile as viewed in cross-section perpendicular to the air flow axis, and one or more filter elements 24, disposed within and supported by the body part. The body part 10 has a peripheral end flange 10a at its upstream end, along the four side edges of the body part 10. The flange 10a fits closely within a substantially square-profiled mounting support or frame 11, suitably made of metal, which is turned inwardly at its downstream end to provide an end seat 11a for the peripheral flange 10a of the body part 10 of the downstream final filter device, the body part 10 extending through and beyond the downstream end opening defined by the inwardly turned seat 11a. One or more final filter retainers 12, shown very diagrammatically in FIG. 2, urge the end flange 10a of the body part 10, via a sealing gasket 14, against the seat 11a on the mounting frame 11, thereby firmly holding the final filter device in a fixed axial position relative to the mounting frame 11, extending across the opening in the downstream end of the mounting frame.

Each pre-filter device 8 is constructed as a single pre-filter media pack, comprising one or more filter elements 8a mounted within a housing box (not specifically shown in FIG. 2) that is substantially square in profile as viewed in the direction of the air flow, and is fitted within the surrounding mounting frame 11.

The upstream pre-filter device 8 is held in position, against the end flange of the downstream final filter device 9 by a clamping force provided by a plurality of retaining springs 13, for example one at each corner region of the pre-filter device 8. Each retaining spring is made from a single length of flexible wire bent to provide an end hook (not shown in FIG. 2) which passes through a hole (also not shown) formed adjacent the upstream edge of the mounting frame 11 to retain the retaining spring captive, a first link piece 13a, a coil spring section 13b, a second link piece 13c, a gripping loop 13d and another hook piece (again not shown in FIG. 2). The coil spring 13b is tensioned by pulling on the gripping loop 13d, until the second hook piece can be inserted into a hole (also not shown) in an upstream end part of the pre-filter device 8, to press the pre-filter device against the final filter device 9.

Lateral alignment between the upstream pre-filter device 8 and downstream filter device 9 is maintained by one or more alignment devices (not shown). These can be of any suitable type, one example being a peg on the mounting part of the upstream pre-filter device 8 pointing, downstream, in the direction of air flow through the filter assembly, and engaging in an aligned hole formed in the end flange 10a of the body part 10 of the downstream final filter device 9.

Since the pre-filter device 8 is required to filter out relatively coarse particles from the air flow to the gas turbine, the filtering efficiency of the pre-filter device 8 tends to reduce more rapidly than the filtering efficiency of the relatively fine final filter device 9, necessitating the more regular replacement of the upstream pre-filter device 8. This unit has an associated unit cost, which is dependent in part on the number of filter elements 8a incorporated in the upstream pre-filter unit, as well as on the mounting box within which the filter elements 8a are located, which effectively also becomes a throw-away or discardable element along with the filter element(s) 8a, since the pre-filter unit 8 is of unitary construction.

In addition, since the lateral alignment of the pre-filter device 8 with the final filter device 9 is ensured by the one or more alignment devices, such as in the form of a protruding peg on the pre-filter device 8 engaging in a correspondingly-sized hole in the end flange 10a of the downstream final filter device 9, the new replacement pre-filter devices that need to be substituted periodically for the upstream pre-filter devices 8 have to be provided with alignment pegs too. Different manufacturers use different forms of alignment device(s), even though the dimensions of the openings in the square mounting frame 11 for filter assemblies in a matrix filter are a standard size of substantially 60.5 cm by substantially 60.5 cm. This requires that the customer has to purchase the correct type of replacement pre-filter devices to suit the alignment device(s) that laterally align the used pre-filter device that is to be replaced and the final filter device to which it is fitted.

The present invention is addressed to providing a more universal arrangement which is suitable for incorporation in filter assemblies of different manufacturers or with different types of alignment device used for the lateral alignment of the pre-filter device and final filter device of a filter assembly, as well as to reducing the cost of replacement parts when the pre-filter unit has to be replaced and facilitating the fitting of replacement parts.

SUMMARY

According to the invention from one aspect there is provided a filter mounting for a filter assembly, the filter assembly comprising:
  a mounting support defining a fluid outlet opening in the support;
  a filter device;
  a fastening arrangement operative to locate the filter device against a seat of the mounting support, so that the filter device extends across the opening, for filtering a fluid medium flowing through the outlet opening and the filter device; and
  a pre-filter device secured, between the fastening arrangement and the filter device, by the fastening arrangement, for pre-filtering fluid medium flowing successively through the pre-filter and the downstream filter device;
  the mounting plate having securing means thereon for enabling at least one filter element to be removably mounted on the mounting plate, to enable the or each filter element to be removed and replaced by a replacement filter element, the mounting plate being for location upstream of the filter device, relative to the fluid flow direction, under the action of the fastening arrangement, the mounting plate and the at least one filter element, when removably mounted on the mounting plate, together constituting the pre-filter device of the filter assembly.

Since the securing means on the mounting plate enables at least one filter element to be removably mounted on the mounting plate, the filter element can be removed and replaced by a replacement filter element, without needing to remove or discard the entire pre-filter unit, as has to be done when the filtering efficiency of the pre-filter unit has degraded to an extent that it can no longer be further used. The or each filter element can simply be released and replaced, whereas changing the entire pre-filter unit of the known filter assembly requires the retaining spring, as well as the one or more final filter retainers, to be released, and they then have to be re-engaged once the replacement pre-filter unit has been positioned within the mounting frame against the end flange of the final filter device. Thus, in general, changing the filter elements can be done more quickly, and easily, and the cost of replacing the pre-filter elements is generally lower, because the mounting plate is left in position within the mounting frame with the final filter retainer(s) engaged.

According to the invention from a second aspect there is provided a pre-filter device for a filter assembly, the filter assembly comprising:
  a mounting support defining a fluid outlet opening in the support;
  a filter device;
  a fastening arrangement operative to locate the filter device against a seat of the mounting support, so that the filter device extends across the opening, for filtering a fluid medium flowing through the outlet opening and the filter device; and
  said pre-filter device, said pre-filter device being secured, between the fastening arrangement and the filter device by the fastening arrangement, for pre-filtering fluid medium flowing successively through the pre-filter device and filter device;
  the pre-filter device comprising a filter mounting plate for location upstream of the filter device, relative to the fluid flow direction, under the action of the fastening arrangement, and at least one filter element removably mounted on the mounting plate, to enable the filter element to be removed and replaced by a replacement filter element.

According to the invention from a third aspect there is provided a filter assembly comprising:
  a mounting support defining a fluid outlet opening in the support;
  a filter device;
  a fastening arrangement operative to locate the filter device against a seat of the mounting support, so that the filter device extends across the opening for filtering fluid medium flowing through the outlet opening and filter device; and
  a pre-filter device secured, between the fastening arrangement and the filter device, by the fastening arrangement, for pre-filtering fluid medium flowing successively through the pre-filter device and the filter device;
  wherein the pre-filter device comprises a filter mounting plate located upstream of the filter device relative to the fluid flow direction, under the action of the fastening arrangement, and at least one filter element removably mounted on the mounting plate, to enable the filter element to be removed and replaced by a replacement filter element.

It will be readily appreciated that the same benefits as mentioned above for the filter mounting plate for the filter assembly apply also to the pre-filter device and the filter assembly itself.

According to a preferred arrangement for the filter mounting plate, pre-filter device or filter assembly, the filter mounting plate is a universal plate for a gas turbine filter assembly and dimensioned so that the mounting support acts to laterally align the pre-filter device with the downstream filter device. The lateral alignment provided by the mounting support avoids the need for a final filter retainer as is used in the known filter assembly according to FIG. 2. Accordingly, the constructional arrangement of the filter assembly is simplified. In particular, the pre-filter device does not require any special alignment parts, such as a projecting peg. Accordingly, the mounting plate can be a universal part, designed to fit a range of different manufacturers' filter devices, irrespective of the particular form of the alignment devices that they use in each case for aligning the pre-filter unit and the final filter device. If need be, cut-outs or the like will need to be formed in the mounting plate, so that it will fit flush with all known manufactured final filter devices.

Since the dimensions of the openings in a standard mounting frame of typical commercially available filter assemblies for gas turbines are a maximum of substantially 60.7 cm by substantially 60.7 cm or substantially 60.5 cm by substantially 60.5 cm or less, preferably the filter mounting plate 2 is substantially square, having external dimensions in the range substantially 57 cm to substantially 60.7 cm, more preferably substantially 58 cm to 60.5 cm, even more preferably substantially 59 cm to substantially 60.4 cm, most preferably substantially 59 cm by substantially 59 cm, as appropriate for the opening dimensions concerned.

In accordance with a preferred arrangement for the filter mounting plate, the pre-filter device or the filter assembly, the filter mounting plate has a peripheral flange for abutment against a peripheral region of the filter device, the peripheral flange being offset from the plane of the principal portion of the mounting plate, on which the at least one filter element is removably mounted or is to be removably mounted, so as to provide a spacing between the principal portion of the mounting plate and the inlet end of the filter device. This spacing is important, especially where the pre-filter device comprises a plurality of filter elements removably mounted on the mounting plate, since the filter elements are normally separated from one another by lands formed in the mounting plate, to ensure that the pre-filter unit as a whole has adequate structural integrity, and the aforementioned spacing enables the air flow passing through outlet apertures in the plate at locations corresponding to the positioning of the removable filter elements to diverge, so as to provide more uniform air flow across the intake to the final filter device, thereby ensuring that the air flow is more effectively filtered by the final filter device. To work effectively, the spacing is preferably 50 mm or more.

In one arrangement for the filter mounting plate, pre-filter device or filter assembly, the plane of said principal portion of the mounting plate and the plane of the peripheral flange are non-parallel, so as to angle the pre-filters downwardly when the filter device is arranged to have a horizontal orientation for its flow direction. This arrangement is designed to promote self-draining of the pre-filter device when used in wet operating environments.

In the filter mounting plate, pre-filter device or filter assembly, the or each filter element may be provided with a bayonet connector part at one end for engagement with a complementary bayonet connector part on the mounting plate, for removably mounting the filter element on the mounting plate. The use of inter-engaging bayonet connector parts enables rapid replacement of the filter canister when required, as well as sure and reliable mounting of the filter canister when it is in place, removably mounted on the mounting plate.

In another preferred arrangement, the or each filter element is provided with a plurality of engagement lugs arranged to be inserted into complementary cut-outs in the mounting plate, after which, on displacing the filter element laterally, the lugs engage behind respective shoulders at one end of the cut-outs. Similarly to the inter-engaging bayonet connector parts, the use of the engaged lugs with their complementary cut-outs enables rapid and easy removal of each filter element and its replacement, as well as secure mounting of each filter element on the mounting plate.

Conveniently, the filter element is in the form of a cartridge or canister. This facilitates handling of the old and new filter elements when the old one needs to be changed.

According to one preferred arrangement, the or each filter element of the pre-filter device comprises a base portion, defining an outlet aperture, and opposite side portions respectively projecting from opposite ends of the base portion, the side portions carrying a filter medium which is secured at its sides to the side portions and at its ends to the base portion and extends between the side portions, so as to adopt a U-configuration, with the base of the U-remote from the base portion and facing the flow of fluid medium, when the filter element is removably mounted on the mounting plate. This pre-filter design helps to optimise separation effectiveness by presenting a relatively large area of filtration medium to the fluid medium flow.

The disclosed filter assembly is especially suited to installation in a combustion air inlet duct of a gas turbine.

BRIEF DESCRIPTION OF THE DRAWINGS

For a better understanding of the invention, and to show how to same may be carried into effect, reference will now be made, by way of example, to the accompanying drawings, in which:

FIG. 6b is a front elevation of the mounting plate;

FIG. 6c is a cross-sectional view taken along the section line VIb-VIc of FIG. 6b;

FIG. 8b is a front elevation of the mounting plate of FIG. 8a;

FIG. 8c is a sectional view taken along the line VIIIc-VIIIc of FIG. 8b;

In the drawings, like reference numerals refer to the same or corresponding components.

DETAILED DESCRIPTION

Figure 3:
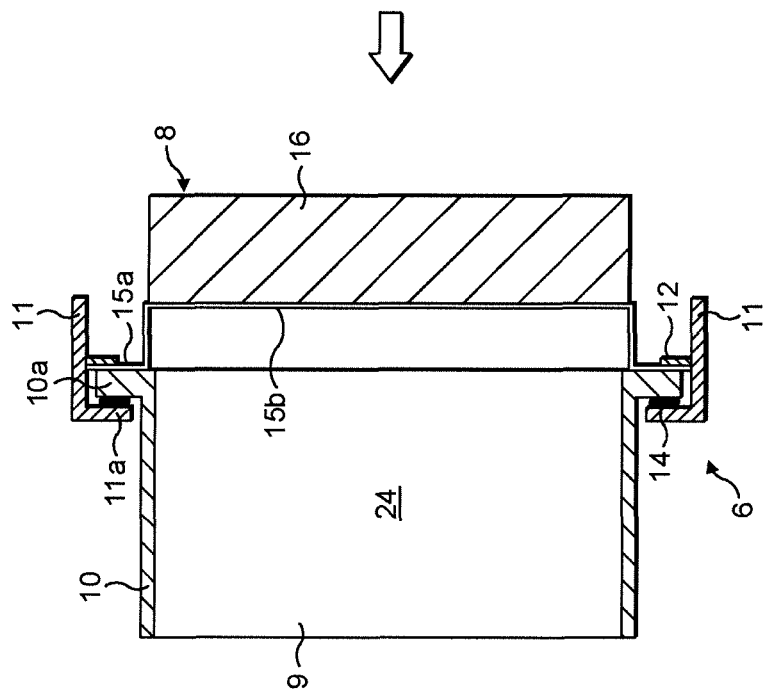
FIG. 3 is a corresponding side view through a first embodiment of the invention.
Figure 2:
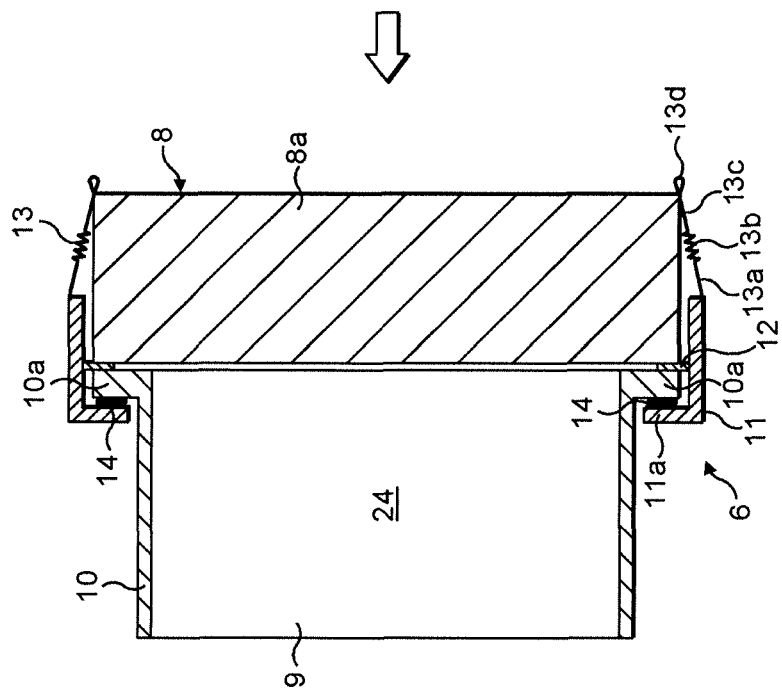
FIG. 2 is a diagrammatic longitudinal section, seen from the side, of one of the filter assemblies of the filter matrix shown in FIG. 1.

Referring to FIG. 3, it will be seen that the schematically shown first embodiment of the invention is similar in many respects to the filter assembly shown in FIG. 2. Accordingly, the basic construction will now be described only briefly.

The filter assembly 6 comprises a mounting support or frame 11, suitably made of metal, of substantially square profile as viewed end-on, and final filter 9, which is also substantially square in profile as viewed end-on, is located within the mounting support or frame 11 with its end flange 10a pressed by final filter retainer 12, via sealing gasket 14, against downstream end seat 11a, with the body part 10 of the final filter device 9 extending through the downstream opening in the mounting frame 11 in the downstream direction.

Figure 1:
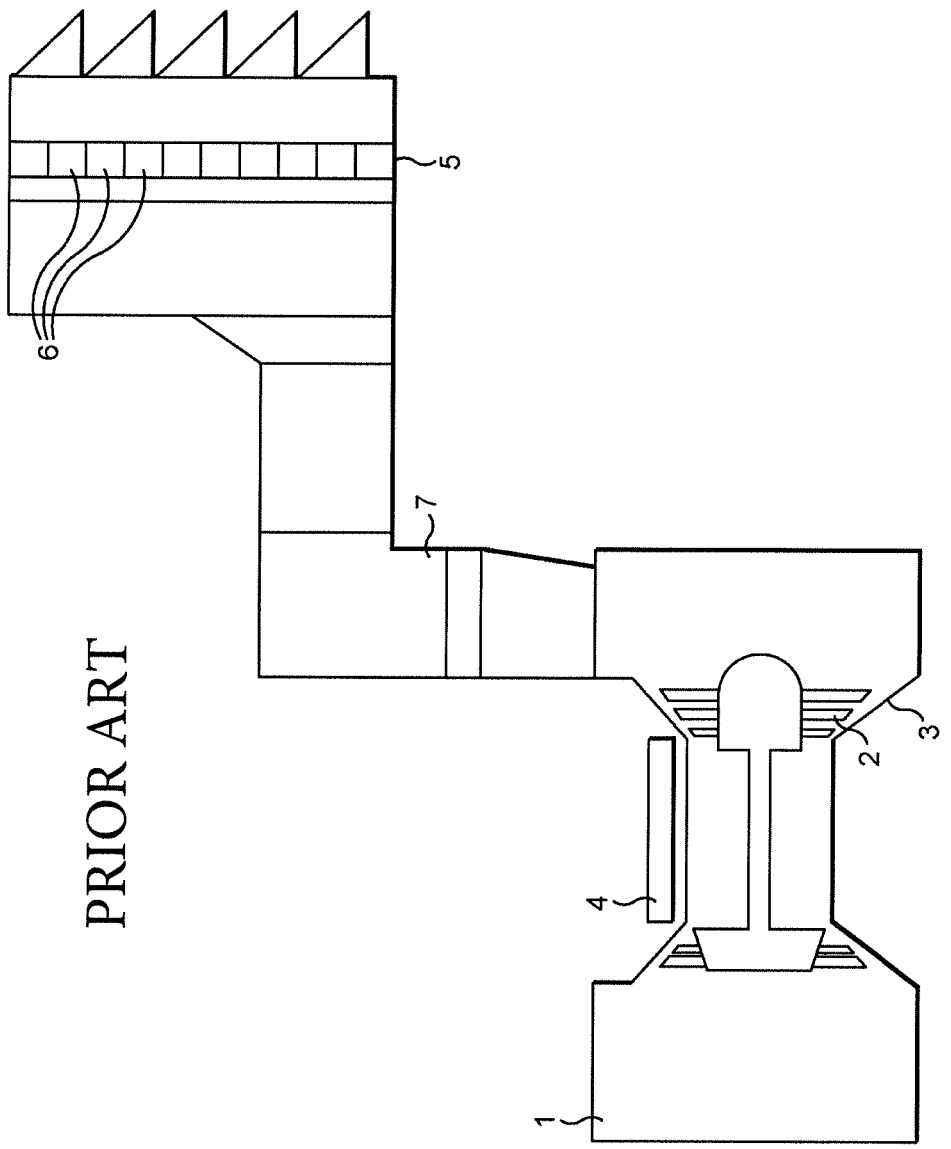
FIG. 1 is a schematic side elevational view of a known gas turbine with air intake incorporating a matrix of two-stage filter assemblies.
Figure 3A:
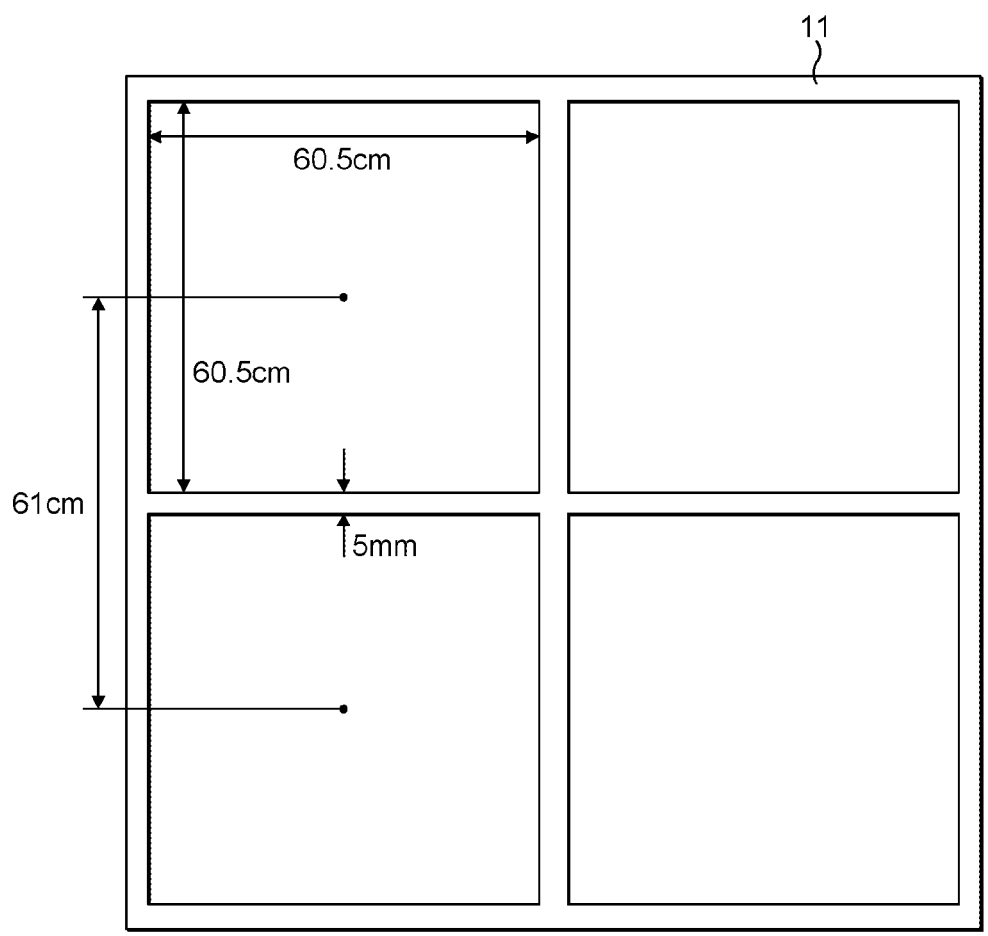
FIG. 3a is a front view, seen in the direction of air flow, of a mounting frame for a 2×2 matrix filter frame, showing certain critical dimensions.

In practice, the filter assembly 6 is one of several forming a matrix of filter assemblies, as explained above with reference to FIG. 1. FIG. 3a shows a front view of a 2×2 matrix frame 11, but the description which follows will apply correspondingly to a p×q matrix frame, where p≥2 and q≥2. The figure is deliberately drawn not to scale, for ease of explanation of the relevant dimensions to be given below. The matrix frame 11 has an (unofficial) nominal size of 61 cm×61 cm, adopted by gas turbine air filter manufacturers nowadays. This dimension is the spacing between the centreline of each filter assembly and that of each adjacent filter assembly. For a typical thickness of substantially 5 mm for the metal used for fabricating all elements of the mounting frame 11, the dimensions of each opening in the mounting frame for receiving a respective filter assembly are substantially 60.5 cm by substantially 60.5 cm, as shown in FIG. 3a. At its minimum, the metal thickness for the frame is unlikely to be less than substantially 3 mm, in which case the largest dimensions of each mounting frame opening will be substantially 60.7 cm by 60.7 cm.

Unlike in the filter assembly described with reference to FIG. 2, the pre-filter device 8 is formed from a mounting plate or adapter plate 15 and one or more filter cartridges 16, which are removably mounted on mounting plate 15. The filter adapter plate is a universal plate, dimensioned so that the mounting frame 11 acts to secure the adapter plate against movement laterally, and thereby align the pre-filter device with the downstream filter device. For this purpose, the adapter plate needs to fit closely within the mounting frame 11.

It will be understood that the external dimensions of the adapter plate will have a maximum size of substantially 60.7 cm. The inventor considers that the minimum size is substantially 57 cm, having regard to the fact that a typical mounting frame has manufacturing tolerances and can have constructional and manufacturing features inside the frame, such as reinforcing lugs, welding features and the like, which have to be accommodated within a gap between the outer edge of the adapter plate and the insider of the mounting frame. More preferably, the external dimensions of the adapter plate lie within the range substantially 58 cm to substantially 60.5 cm and even more preferably substantially 59 cm to substantially 60.4 cm. Preferred external dimensions for the adapter plate are substantially 59 cm by substantially 59 cm.

As can be clearly seen in FIG. 3, the adapter plate 15 has a peripheral flange 15a which is offset from the plane of the principal portion 15b of the adapter plate 15. The mounting plate 15 can suitably be made of metal, but a plastics material is to be preferred on cost and strength considerations. It is relatively thin, for example 2.5 mm. It will be appreciated that this small thickness can be readily accommodated, when locating the adapter plate between the final filter retainer(s) 12 and the end flange 10a of final filter device 9, by commensurate additional compression of sealing gasket 14.

It will be noted that since the adapter plate 15 of the pre-filter device 8 is clamped between the final filter retainer(s) 12 and the end flange 10a of the final filter device 9, it is adequately held in position relative to the mounting frame 11 and final filter device 9, without needing to use any retaining springs such as the springs 13 in the known filter assembly.

Figure 4:
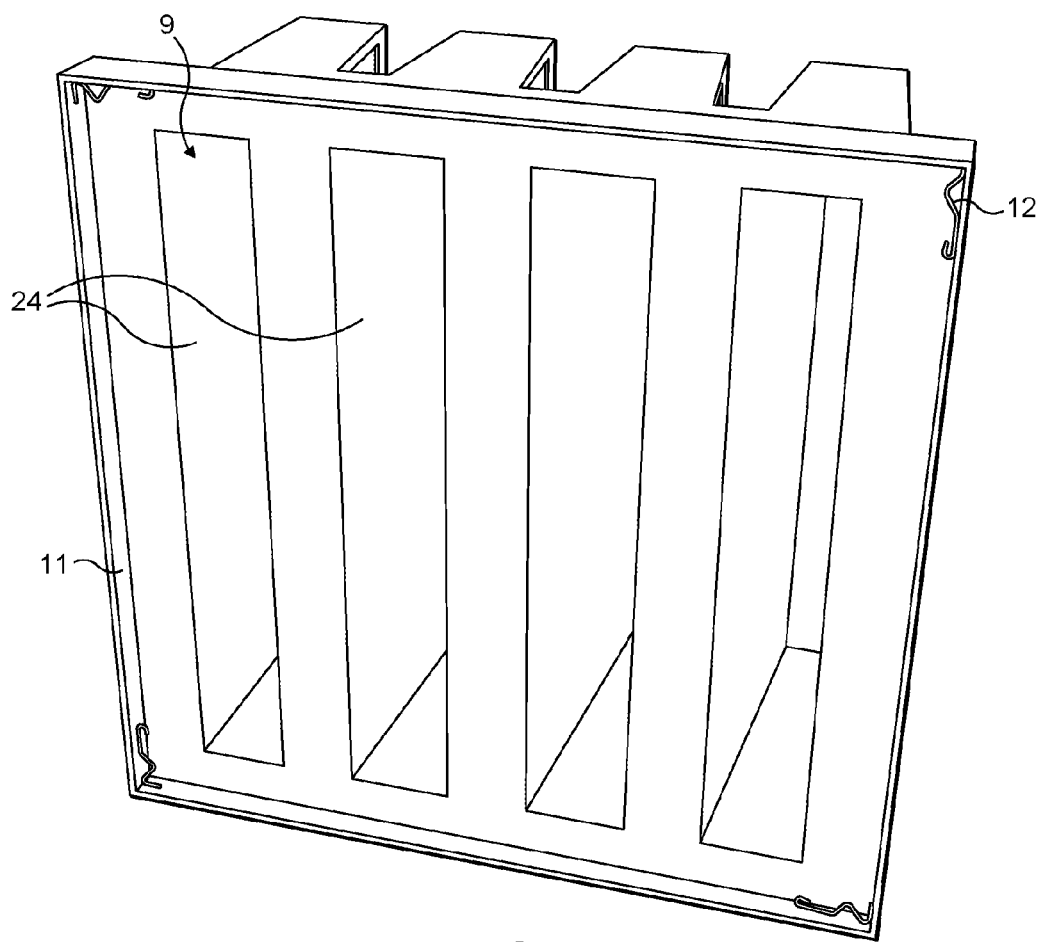
FIG. 4 is a front view from above showing a final filter device, held, in a filter mounting support or frame, by retaining clips.

FIG. 4 is a front view showing the final filter device 9 located within the mounting frame 11, according to one arrangement. Here, the final filter device comprises a plurality (specifically four, but this is for illustrative purposes only) of filter elements 24 mounted on a body part 10 of square shape. Each filter element comprises a filter medium folded into a V configuration, so that its two side faces progressively converge towards the base of the V, which is located remote from its intake opening at the entrance to the V. The filter medium may be made of a pleated paper product.

Figure 5:
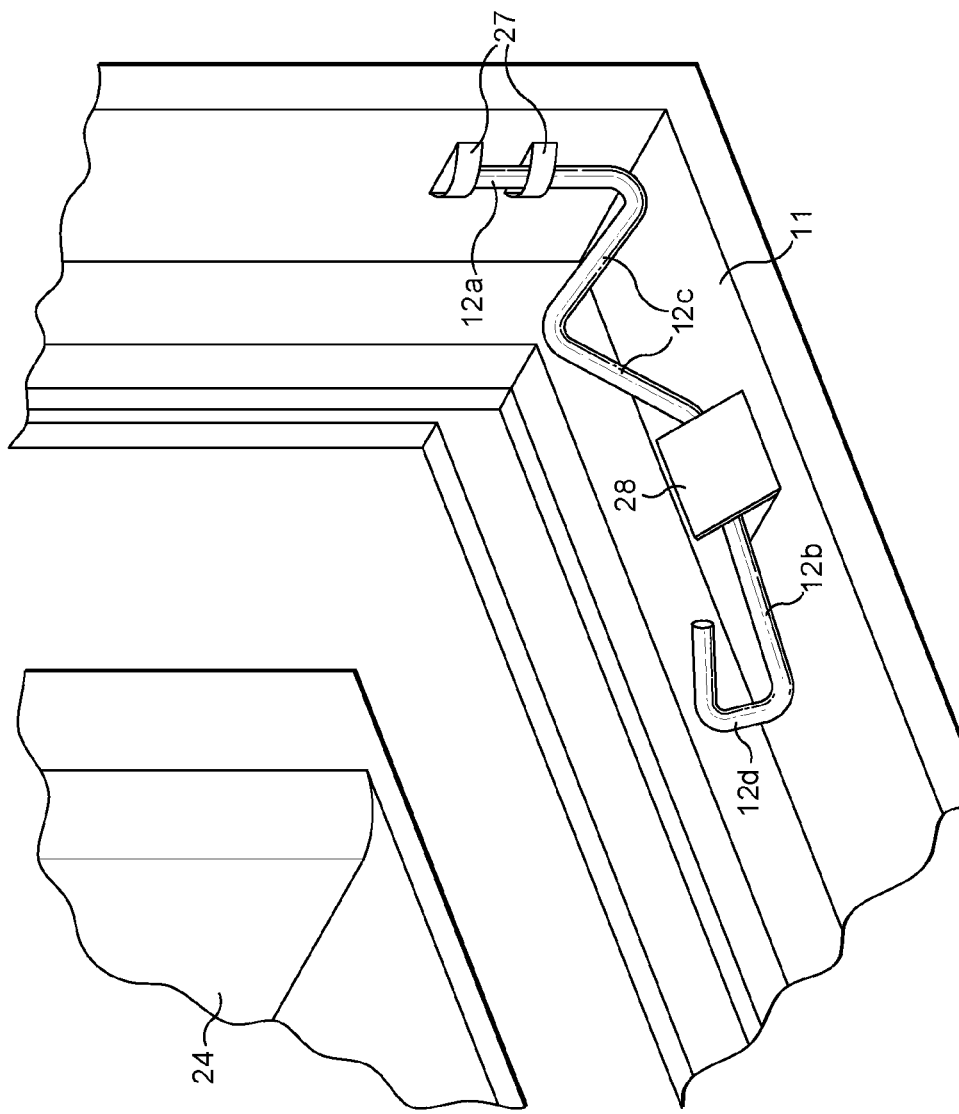
FIG. 5 is a perspective view from above, showing one of the retaining clips in detail.

FIG. 5 is a detail of FIG. 4, showing one of the four final filter retainers 12. As can be seen, the retainer is made from a piece of bent rigid wire, which provides an angled end portion 12a, a main section 12b including an offset portion 12c and a handle 12d. A pair of lugs 27 cut in the mounting frame, which is made of metal, are bent out of the plane of the respective side of the frame and shaped to receive and hold captive the angled end portion 12a of the retainer 12, which can accordingly pivot between a first position in which the main section 12b is in contact with the frame side to allow the final filter device to be inserted or removed, as required, and a second portion (shown in FIG. 5) in which the offset portion 12c applies a clamping force to the body part 10 of the final filter device, to clamp it within the frame 11, and the main section 12b is engaged behind a retainer tab 28 cut and bent out of the plane of the adjacent side portion of the mounting frame 11.

The described and illustrated final filter retainer 12 is purely exemplary and other types of retainer will be suitable for the filter assembly, as will be apparent to skilled persons.

Referring now to FIGS. 6a to 6d, there is shown the component parts of a preferred design for the pre-filter device 8.

Figure 6A:
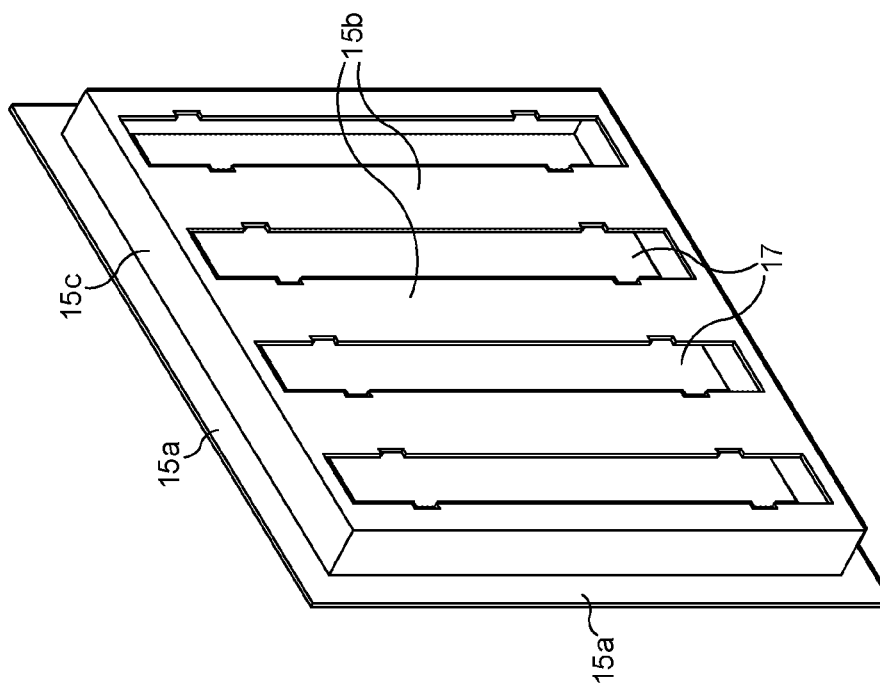
FIG. 6a is a front perspective view from above and from one side of the filter mounting plate.

As shown in FIGS. 6a, 6b and 6c, the adapter plate 15 is square when viewed from the front. Suitably, it is made of plastics material and is a one piece injection moulding. It is preferably formed with an offset, so that it takes the form of a principal plate portion 15b, having a peripheral flange 15a that is offset in a plane that is parallel to and spaced from the plane of the principal plate portion 15b, and a connecting rim portion 15c which connects the peripheral flange 15a to the principal plate portion 15b. The adapter plate 15 is designed as a universal plate that sits closely within the internal space within the mounting frame 11 and has external dimensions within the range substantially 57 cm to 60.7 cm, or the preferred sub-ranges or preferred dimensions explained above. Since the mounting plate 15 fits sufficiently closely within the surrounding mounting support 11, adequate lateral alignment of the mounting plate with the final filter device 9 is ensured. The offset in the flow direction through the filter assembly as between the principal plate portion 15b and the peripheral flange 15a is substantially 50 mm, by way of example.

The principal plate portion 15b of the mounting plate 15 is formed with a plurality of elongate apertures 17. In the illustrated example, there are four such apertures; however, it will be appreciated that the number of apertures is not relevant, other than it will depend upon the design requirements for any particular filter assembly. The apertures are provided at spaced-apart locations corresponding to the required locations for the filter cartridges 16. Accordingly, the principal plate portion 15b provides a land 15d between each elongate aperture 17 and the next one. These lands serve to maintain sufficient rigidity for the adapter plate 15.

Figure 6D:
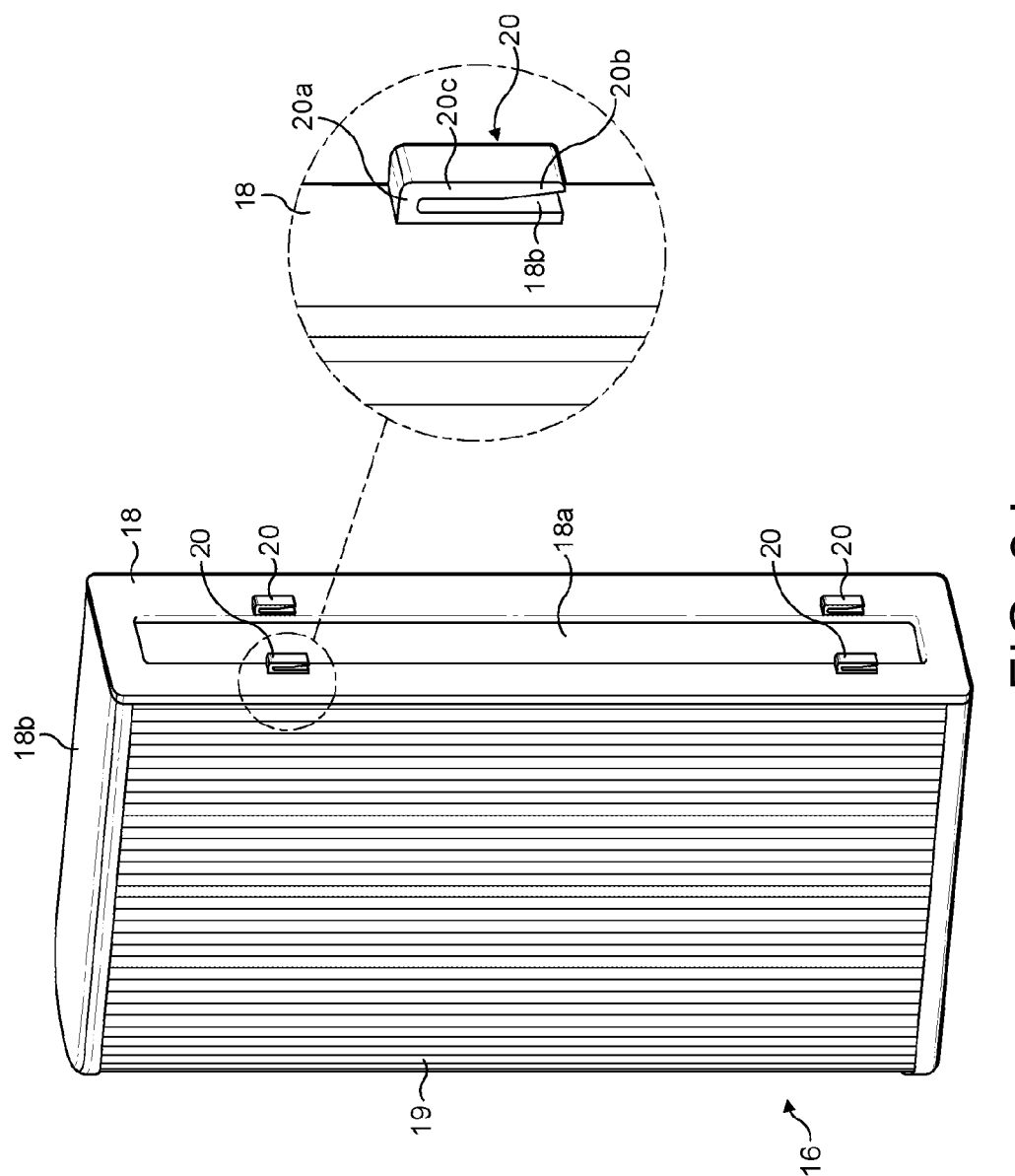
FIG. 6d is a side perspective view from above and from the rear of a filter cartridge, also including an enlarged view of an engagement lug of the filter cartridge.

Referring to FIG. 6d, each filter cartridge 16 incorporates a body structure comprising an elongate base portion 18, defining a central air outlet aperture 18a, and opposite side portions 18b respectively projecting from opposite ends of the base portion 18. Each side portion is in the shape of a U, having substantially parallel sides except at the remote end region where the side portions 18b are semicircular.

Figure 8A:
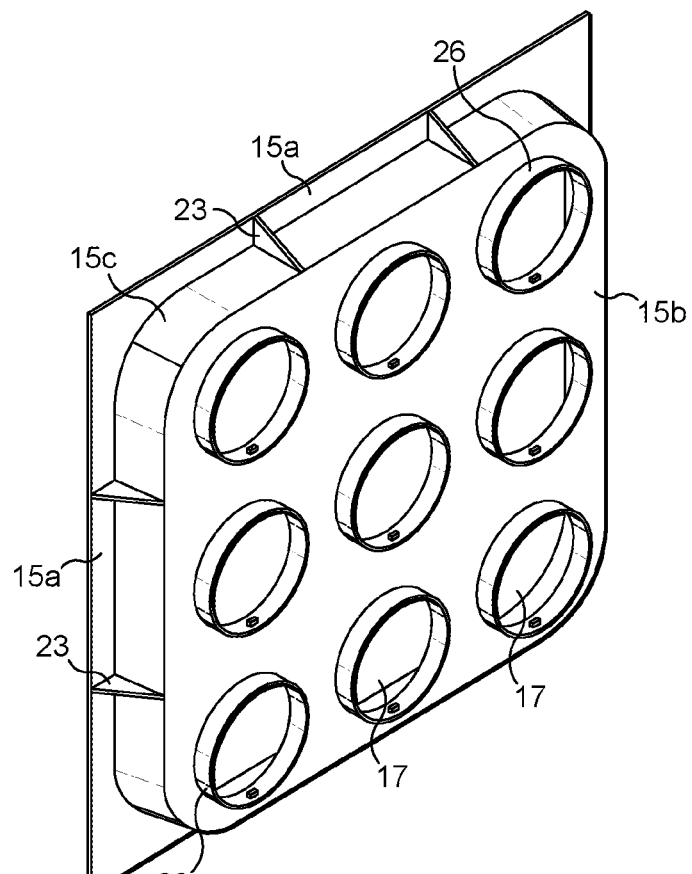
FIG. 8a is a corresponding view to FIGS. 6a and 7a showing another form of mounting plate for carrying a plurality of cylindrical filter canisters.

The side portions 18b carry a filter medium 19 which is secured at its sides to the side portions 18b and at its ends to the base portion 18, and extends between the side portions 18b, so as to adopt a U-configuration. When fitted to the adapter plate 15, in a manner to be described hereinbelow, the base filter medium part of the U faces the approaching air flow (as clearly shown in FIG. 8), so that the air flow is constrained to pass through the filter medium at its U-base and along the two sides of the U, before passing out through the outlet 18a and the associated elongate aperture 17 in the adapter plate 15, so as to remove coarse particulates from the air flow. As is the case of the filter medium of the final filter device, the filter medium 19 is suitably a pleated paper product.

FIG. 6d shows the manner in which each disposable filter cartridge 16 is secured to the adapter plate 15 in register with its associated elongate aperture 17. As particularly shown in the enlarged view of FIG. 4d, two pairs of engagement lugs 20 are formed integrally with the base portion 18, one on each side of the air outlet 18a, close to each end of the base portion 18. Corresponding cut-outs 21 are formed in the lands 15d (FIG. 6b), so that the engagement lugs 20 can be aligned with and enter the respective cut-outs 21, to bring the face of base portion 18 of the pre-filter cartridge into contact with the face of the adjacent lands 15d of adapter plate 15. Then, the filter unit 16 is displaced downwardly, to cause the engagement lugs 20 to engage behind shoulders 22 of the lands 15d, which define the lower ends of the cut-outs 21. When the connecting neck portion 20a of the engagement lug 20 comes into direct contact with the shoulder 22, the filter cartridge 16 is located in its final, engaged, positions.

As shown in FIG. 6d, the leading portion 20b of the engagement lug 20 is tapered. This facilitates initial location of the leading end of the engagement lug 20 behind the shoulder 21. Furthermore, as the filter cartridge is progressively displaced downwardly, the tapered surface of each tapered portion 20b progressively draws a raised portion 18b on the base portion 18 against the adjacent land 15d by a camming or wedging action, until the shoulder 21 starts to pass behind a straight portion 20c of the engagement lug 20. Further displacement of the pre-filter cartridge causes the shoulder 22 to enter the channel defined between the straight portion 20c of the engagement lug 20 and a raised portion 18b on the base portion 18, until it abuts the neck portion 20a. The raised portion 18b serves to localise and increase the clamping effect caused by slight elastic deformation of the engagement lug 20 as it engages behind the shoulder 22 on the adapter plate 15.

Figure 7A:
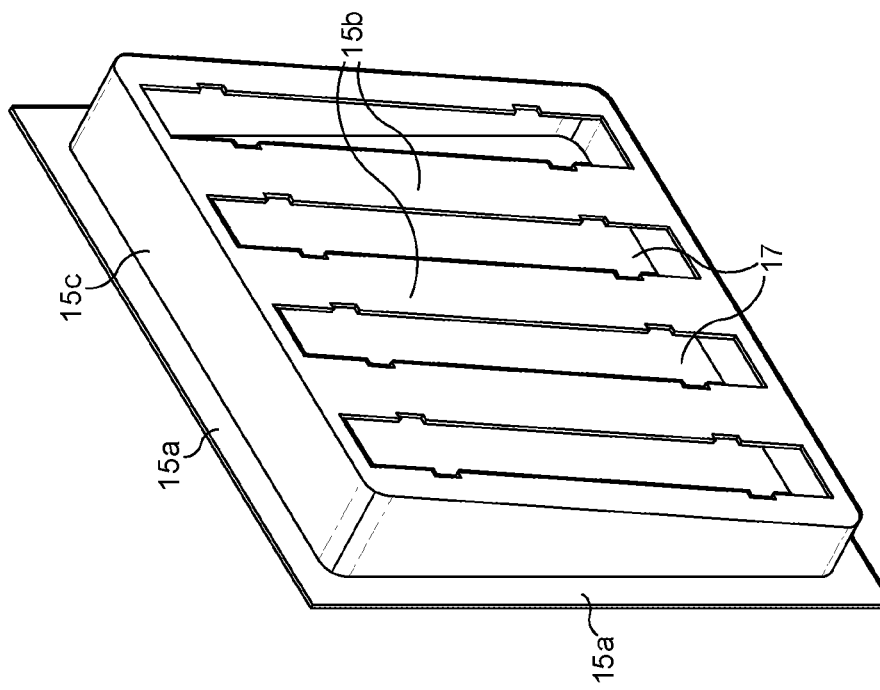
FIG. 7a is a view, corresponding to that of FIG. 6a, showing a modification for use in promoting self-draining when the filter cartridges are to be used in a wet environment.

FIG. 7a is a perspective view, corresponding to that of FIG. 6a, showing a modified adapter plate 15, designed for a filter assembly 6 to be used in wet environments, that is to say ones in which water or other condensate is formed in the filter cartridges and needs to be drained off by gravity. As shown in FIG. 7a, the plane of the principal plate portion 15d of the adapter plate 15 and the plane of the peripheral flange 15a are non-parallel. Accordingly, the pre-filter cartridges 16 are angled downwardly at a shallow angle when the adapter plate, with filter cartridges removably mounted on it, is fitted in the filter assembly 6 with the final filter device 9 arranged to have a horizontal orientation for its flow axis. In this way, self-draining of the pre-filter unit in wet environments is achieved.

FIGS. 8a to 8d together show a modified pre-filter device consisting of an adapter plate 15 and a plurality of cylindrical filter canisters 16.

The adapter plate is suitably made of plastic material. It is similar in form to the one shown in the preceding embodiments, but it includes strengthening ribs 23 between the peripheral flange 15a and the rim portion 15c and the respective apertures 17 in the plate for the cylindrical filter canisters are circular. The canisters 16, when fitted to the adapter plate 15, are arranged in a matrix of rows and columns. In the illustrated example, the cylindrical canisters 16 form a matrix of 3×3=9 canisters, but different numbers of rows and columns can be used according to particular requirements.

Figure 8D:
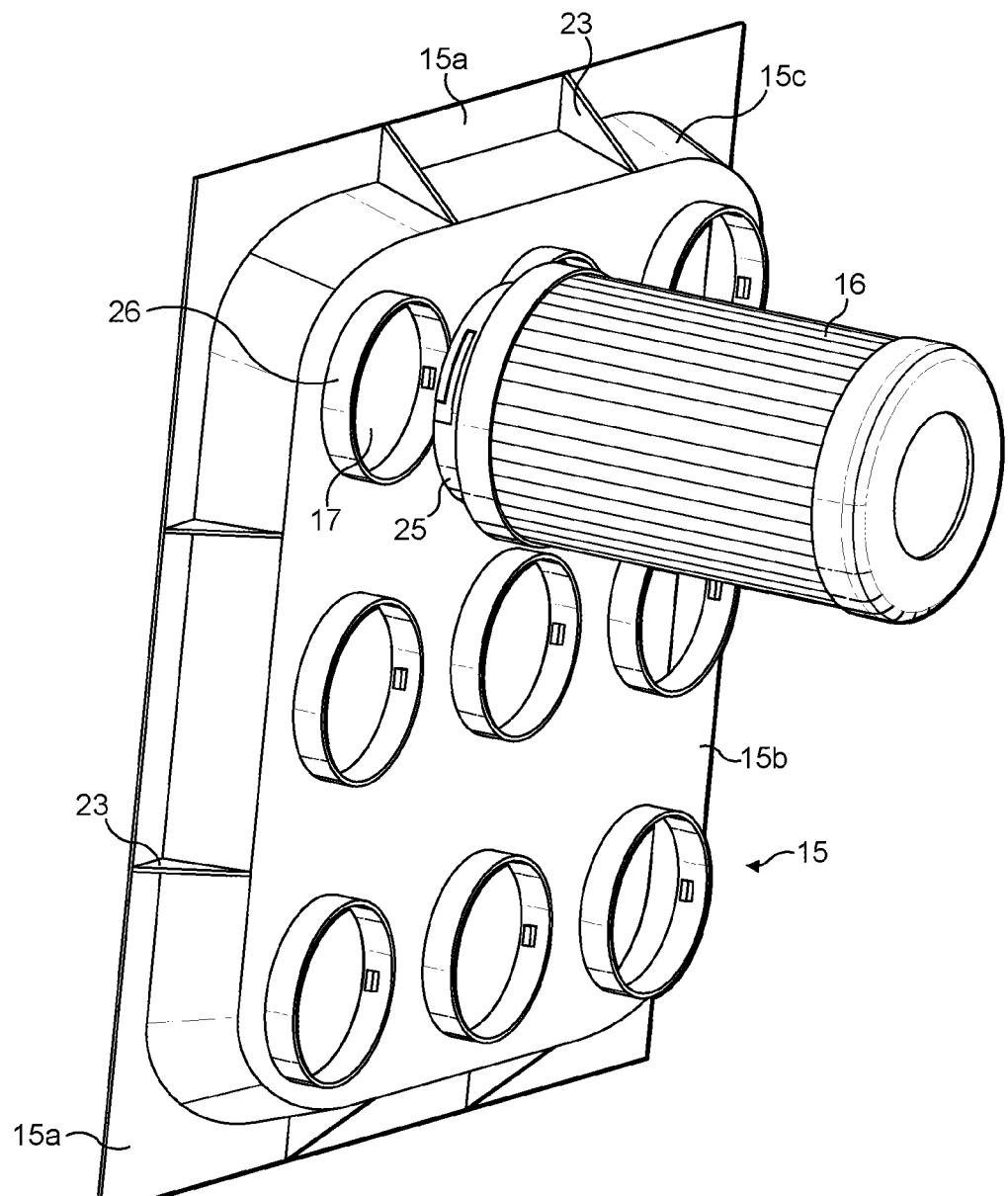
FIG. 8d is a front perspective view from the side and above showing a cylindrical filter cartridge about to be removably fitted to the mounting plate.

As shown in FIG. 8d, in order to hold each filter canister 16 in position, it is provided with a bayonet connector 25 at its base end, which engages with a complementary bayonet fitting 26 formed integrally on the adapter plate 15. With this arrangement, it is possible to rapidly and securely mount each filter canister 16 on the adapter plate 15, as well as remove it from the mounting plate when the filter canister needs to be replaced by a new one.

Figure 9:
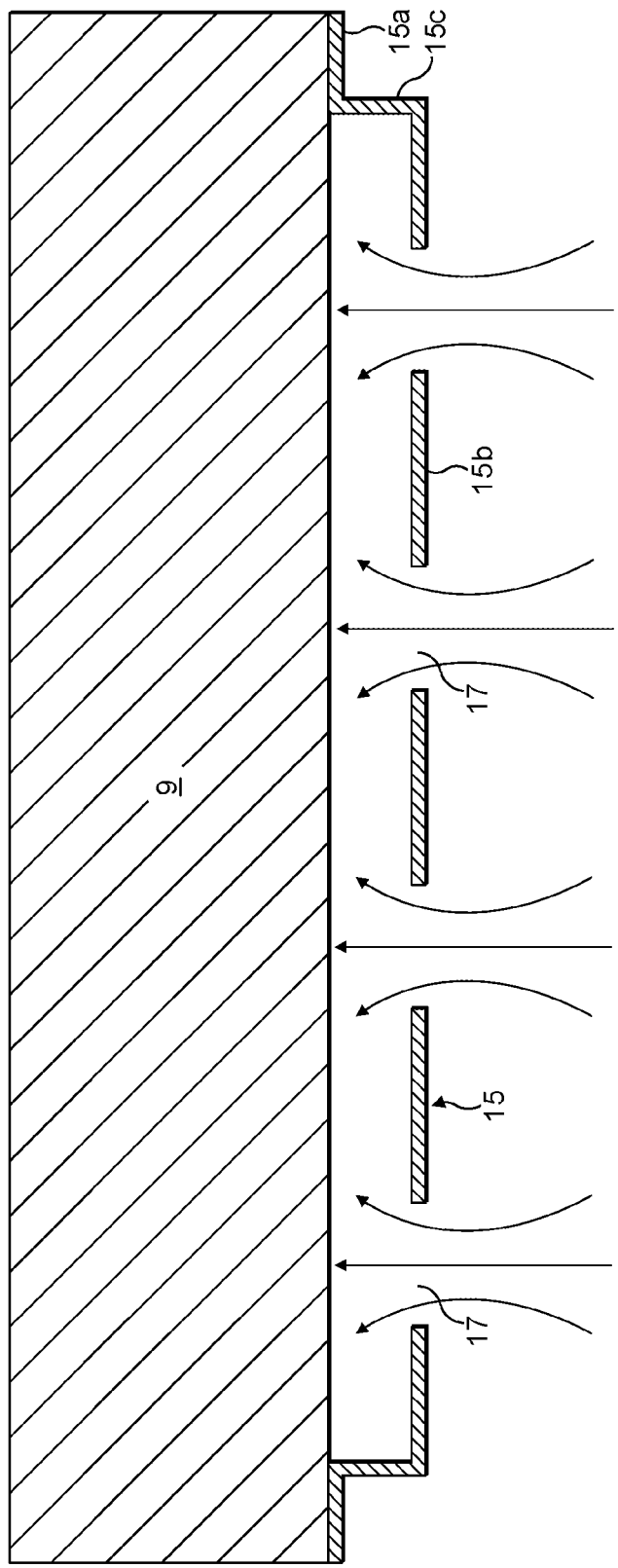
FIG. 9 is a diagrammatic view illustrating the benefit of achieving uniformity of air flow across the lateral extent of the final filter device by designing the filter mounting plate to provide separation, in the direction of air flow through the filter assembly, between the pre-filter device and the final filter device.

FIG. 9 diagrammatically illustrates the benefit afforded by designing the adapter plate 15 to have an offset, so that a spacing is provided between the outlet plane of the pre-filter device (specifically the outlet plane of the adapter plate) and the inlet plane of the final filter 9. As indicated by the arrows, the air flow tends to diverge as it passes through the individual apertures 17 in the adapter plate 15, so as to assist in developing a more uniform air flow across the width of the final filter device 9. This enables the entire filtering capacity of the final filter device 9 to be employed. It also reduces the necessity for individual filter elements included in the final filter device to be aligned with and of similar dimensions to the air outlet apertures in the adapter plate. This allows greater flexibility in the design of the pre-filter adapter plate and filter cartridge layout, giving good filtering performance with varying designs for the final filter device.

Figure 10:
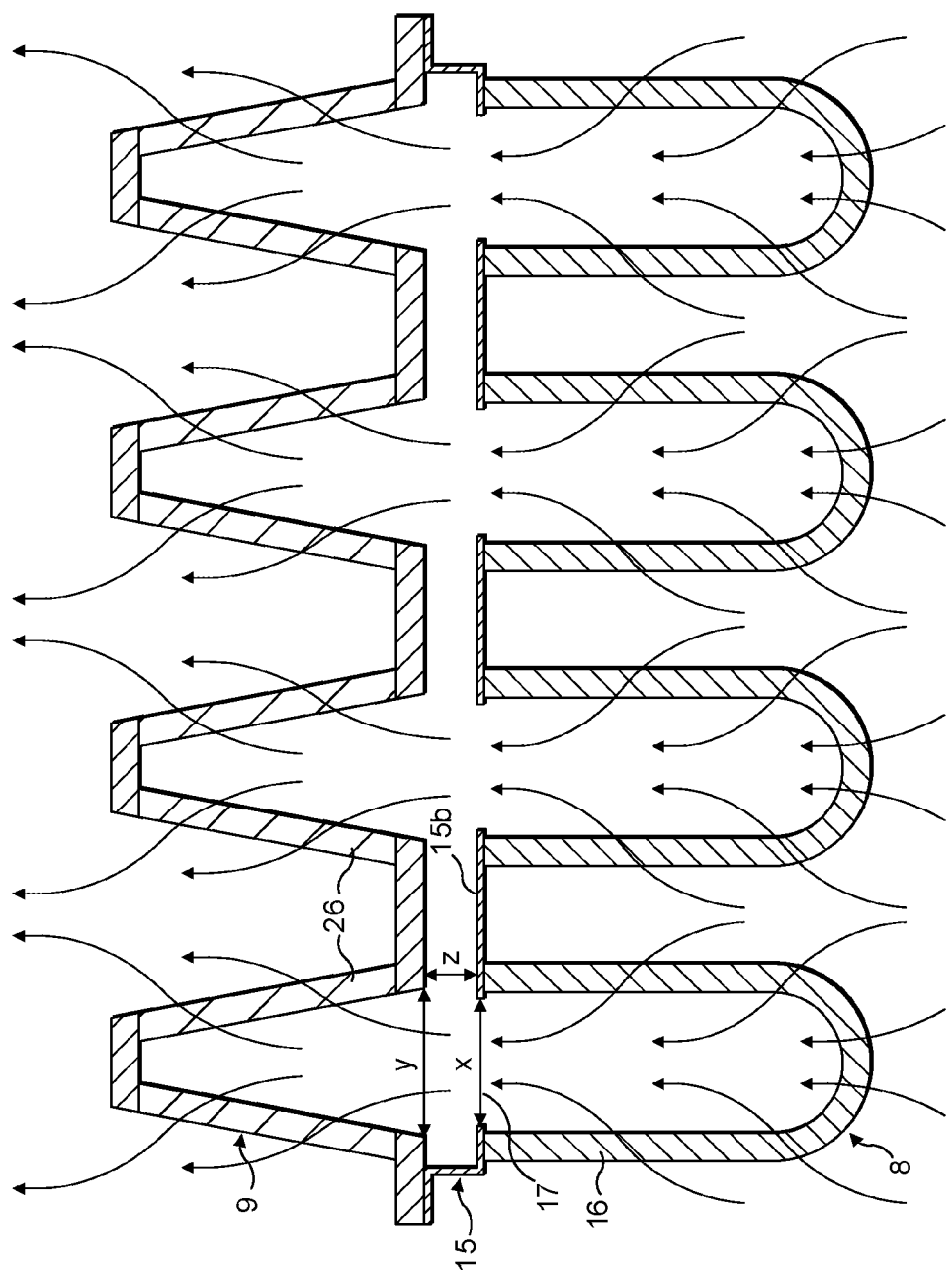
FIG. 10 is a schematic view from above showing the air flow through the entire filter assembly, especially the uniform air flow distribution achieved through the axial separation between the pre-filter device and the final filter device.

FIG. 10 diagrammatically illustrates the air flow path through one form of filter assembly, corresponding to the embodiment according to FIGS. 3 to 5 and 6a to 6d. Here it can be seen that the width x of each aperture 17 in the adapter plate 15 is less than the width y of the intake opening of a respective filter element in the final filter device 9. However, the spacing z between the principal plate portion 15b of the adapter plate 15 of the pre-filter device 8 and the final filter device 9 enables adequate air flow development such that the entire width y of the intake opening of each filter element of the final filter device 9 can be fully utilised.

Ideally, the spacing x between the principal portion of the adapter plate and the final filter device is 50 mm or more.

With the arrangements described, each filter cartridge or canister is held firmly and securely in place, but can be quickly and easily removed from the adapter plate and replaced with a new replacement filter. It will be appreciated that this procedure is much simpler to perform, despite the number of filter cartridges or canisters needing to be changed, than by disconnecting the retaining springs and final filter retainer(s) of the known filter assembly described with reference to FIG. 2, discarding the used pre-filter unit, replacing it with a new one and securing the new one in place within the mounting frame by engaging the final filter retainer(s) and the retaining springs. Furthermore, the adapter plate is retained in situ in the filter assembly and can be re-used for several changes of the pre-filter cartridges or canisters.

Ordinarily, the adapter plate with fitted pre-filter cartridges or canisters will be disposed of and replaced by a new adapter plate with fitted new pre-filter cartridges or canisters, each time that the final (coarse) filter device is changed, since the final filter retainers will need to be released to enable the final filter device to be changed, at this time anyway. Typical filter change frequencies are once every 6 months approximately for the pre-filters and once every 2 years approximately for the final filter device.

It should also be noted that if the pre-filters are changed when the final filter device does not ordinarily need changing but the pressure drop within the filter assembly is still greater than expected, the adapter plate with fitted pre-filters could be removed from the mounting frame as a single unit, the final filter device replaced and then the pre-filter unit re-fitted within the mounting frame and re-clipped in position.

Additionally, with the filter assemblies described, maintenance costs will generally be lower since the cost of the individual filter cartridges or canisters will generally be lower than the cost of a single pre-filter unit comprising a mounting part 8b carrying integral filter elements.

Another advantage is that no additional fastening means are required to hold the pre-filter device in place; the filter retainers for the final filter device being adequate to hold the pre-filter device in place within the support frame too.

It is important that the peripheral flange of the adapter plate fit flat against the end flange of the final filter device, irrespective of the type of alignment device used to laterally align the two filter devices. Therefore, when necessary, the peripheral flange of the adapter plate needs to have cut-outs, openings or the like formed in it at appropriate locations, in order to allow the pre-filter device to fit snugly against the final filter device, in the case of all known-at-the-time manufacturer alignment devices.

The use of pleated paper products for the filter mediums of the pre-filter device and final filter device, together with the U-configurations and V-configurations respectively, for the pre-filter device and final filter device ensures effective removal of coarse and fine particles from the air flow, with relative small pressure gradients across each filter device.

Although the filter assemblies disclosed herein are preferably incorporated in the air intake duct leading to a gas turbine for use in electrical power generators, they may be used instead in other applications where a fluid medium is to be filtered to remove entrained components from the fluid medium flow.

The invention claimed is:

1. A filter assembly comprising:
   a mounting support defining a fluid outlet opening in the support;
   a filter device;
   a fastening arrangement operative to locate the filter device against a seat of the mounting support, so that the filter device extends across the opening for filtering fluid medium flowing through the outlet opening and filter device; and
   a pre-filter device secured, between the fastening arrangement and the filter device, by the fastening arrangement, for pre-filtering fluid medium flowing successively through the pre-filter device and the filter device;
   wherein the pre-filter device comprises a filter mounting plate located upstream of the filter device relative to the fluid flow direction, under the action of the fastening arrangement, and at least one filter element removably mounted on the filter mounting plate, to enable the filter element to be removed and replaced by a replacement filter element.

2. A filter assembly according to claim 1, wherein the filter assembly is adapted to be installed in an air inlet duct of a gas turbine.

3. A filter assembly according to claim 1, wherein the filter mounting plate is a universal plate for a gas turbine filter assembly and dimensioned so that the mounting support acts to laterally align the pre-filter device with the filter device.

4. A filter assembly according to claim 1, wherein the filter mounting plate is substantially square, having external dimensions in one of the following ranges: substantially 57 cm to substantially 60.7 cm, substantially 58 cm to 60.5 cm, substantially 59 cm to substantially 60.4 cm, and substantially 59 cm by substantially 59 cm.

5. A filter assembly according to claim 1, wherein the filter mounting plate comprises a principal portion defining a plane, and a peripheral flange for abutment against a peripheral region of the filter device, the peripheral flange being offset from the plane of the principal portion of the filter mounting plate, on which the at least one filter element is removably mounted or is to be removably mounted, so as to provide a spacing between the principal portion of the filter mounting plate and the inlet end of the filter device.

6. A filter assembly according to claim 5, wherein said spacing is 50 mm or more.

7. A filter assembly according to claim 5, wherein the plane of said principal portion of the filter mounting plate and the plane of the peripheral flange are non-parallel, so as to angle the pre-filters downwardly when the filter device is arranged to have a horizontal orientation for its flow direction.

8. A filter assembly according to claim 1, wherein the filter mounting plate further comprises a bayonet connector part thereon, and wherein the or each filter element is provided with a complementary bayonet connector part at one end for engagement with the bayonet connector part on the filter mounting plate, for removably mounting the filter element on the filter mounting plate.

9. A filter assembly according to claim 1, wherein the or each filter element is provided with a plurality of engagement lugs arranged to be inserted into complementary cut-outs in the filter mounting plate, after which, on displacing the filter element laterally, the lugs engage behind respective shoulders at one end of the cut-outs.

10. A filter assembly according to claim 1, wherein the or each filter element is in the form of a cartridge or canister.

11. A filter assembly according to claim 10, wherein the or each filter element comprises a base portion, defining an outlet aperture and opposite side portions respectively projecting from opposite ends of the base portion, the side portions carrying a filter medium which is secured at its sides to the side portions and at its ends to the base portion and extends between the side portions, so as to adopt a U-configuration, with the base of the U-remote from the base portion and facing the flow of fluid medium, when the filter element is removably mounted on the filter mounting plate.

12. A filter mounting plate for a filter assembly, the filter assembly comprising:
   a mounting support defining a fluid outlet opening in the support;
   a filter device;
   a fastening arrangement operative to locate the filter device against a seat of the mounting support, so that the filter device extends across the opening, for filtering a fluid medium flowing through the outlet opening and the filter device; and
   a pre-filter device secured, between the fastening arrangement and the filter device, by the fastening arrangement, for pre-filtering fluid medium flowing successively through the pre-filter and the filter device;
   the filter mounting plate comprising securing means thereon for enabling at least one filter element to be removably mounted on the filter mounting plate, to enable the or each filter element to be removed and replaced by a replacement filter element, the filter mounting plate being for location upstream of the filter device, relative to the fluid flow direction, under the action of the fastening arrangement, the filter mounting plate and the at least one filter element, when removably mounted on the filter mounting plate, together constituting the pre-filter device of the filter assembly;

wherein the filter mounting plate comprises a principal portion defining a plane, and a peripheral flange for abutment against a peripheral region of the filter device, the peripheral flange being offset from the plane of the principal portion of the filter mounting plate, on which the at least one filter element is to be removably mounted, so as to provide a spacing between the principal portion of the filter mounting plate and the inlet end of the filter device; and wherein the plane of said principal portion of the filter mounting plate and the plane of the peripheral flange are non-parallel, so as to angle the pre-filters downwardly when the filter device is arranged to have a horizontal orientation for its flow direction.

13. A filter mounting plate according to claim 12, wherein said spacing is 50 mm or more.

14. A filter mounting plate for a filter assembly, the filter assembly comprising:
a mounting support defining a fluid outlet opening in the support;
a filter device;
a fastening arrangement operative to locate the filter device against a seat of the mounting support, so that the filter device extends across the opening, for filtering a fluid medium flowing through the outlet opening and the filter device; and
a pre-filter device secured, between the fastening arrangement and the filter device, by the fastening arrangement, for pre-filtering fluid medium flowing successively through the pre-filter and the filter device;
the filter mounting plate comprising securing means thereon for enabling at least one filter element to be removably mounted on the filter mounting plate, to enable the or each filter element to be removed and replaced by a replacement filter element, the filter mounting plate being for location upstream of the filter device, relative to the fluid flow direction, under the action of the fastening arrangement, the filter mounting plate and the at least one filter element, when removably mounted on the filter mounting plate, together constituting the pre-filter device of the filter assembly;
wherein the or each filter element is provided with a plurality of engagement lugs arranged to be inserted into complementary cut-outs in the filter mounting plate, after which, on displacing the filter element laterally, the lugs engage behind respective shoulders at one end of the cut-outs.

15. A pre-filter device for a filter assembly, the filter assembly comprising:
a mounting support defining a fluid outlet opening in the support;
a filter device; and
a fastening arrangement operative to locate the filter device against a seat of the mounting support, so that the filter device extends across the opening, for filtering a fluid medium flowing through the outlet opening and the filter device;
said pre-filter device being adapted to be secured, between the fastening arrangement and the filter device by the fastening arrangement, for pre-filtering fluid medium flowing successively through the pre-filter device and filter device;
the pre-filter device comprising:
a filter mounting plate for location upstream of the filter device, relative to the fluid flow direction, under the action of the fastening arrangement, and
at least one filter element removably mounted on the filter mounting plate, to enable the filter element to be removed and replaced by a replacement filter element;
wherein the filter mounting plate comprises a principal portion defining a plane, and a peripheral flange for abutment against a peripheral region of the filter device, the peripheral flange being offset from the plane of the principal portion of the filter mounting plate, on which the at least one filter element is removably mounted or is to be removably mounted, so as to provide a spacing between the principal portion of the filter mounting plate and the inlet end of the filter device; and
wherein the plane of said principal portion of the filter mounting plate and the plane of the peripheral flange are non-parallel, so as to angle the pre-filters downwardly when the filter device is arranged to have a horizontal orientation for its flow direction.

16. A pre-filter device according to claim 15, wherein said spacing is 50 mm or more.

17. A pre-filter device for a filter assembly, the filter assembly comprising:
a mounting support defining a fluid outlet opening in the support;
a filter device; and
a fastening arrangement operative to locate the filter device against a seat of the mounting support, so that the filter device extends across the opening, for filtering a fluid medium flowing through the outlet opening and the filter device;
said pre-filter device being adapted to be secured, between the fastening arrangement and the filter device by the fastening arrangement, for pre-filtering fluid medium flowing successively through the pre-filter device and filter device;
the pre-filter device comprising:
a filter mounting plate for location upstream of the filter device, relative to the fluid flow direction, under the action of the fastening arrangement, and
at least one filter element removably mounted on the filter mounting plate, to enable the filter element to be removed and replaced by a replacement filter element;
wherein the or each filter element is provided with a plurality of engagement lugs arranged to be inserted into complementary cut-outs in the filter mounting plate, after which, on displacing the filter element laterally, the lugs engage behind respective shoulders at one end of the cut-outs.

18. A pre-filter device for a filter assembly, the filter assembly comprising:
a mounting support defining a fluid outlet opening in the support;
a filter device; and
a fastening arrangement operative to locate the filter device against a seat of the mounting support, so that the filter device extends across the opening, for filtering a fluid medium flowing through the outlet opening and the filter device;

said pre-filter device being adapted to be secured, between the fastening arrangement and the filter device by the fastening arrangement, for pre-filtering fluid medium flowing successively through the pre-filter device and filter device;

the pre-filter device comprising:
- a filter mounting plate for location upstream of the filter device, relative to the fluid flow direction, under the action of the fastening arrangement, and
- at least one filter element removably mounted on the filter mounting plate, to enable the filter element to be removed and replaced by a replacement filter element;

wherein the or each filter element is in the form of a cartridge or canister; and wherein the or each filter element comprises a base portion, defining an outlet aperture and opposite side portions respectively projecting from opposite ends of the base portion, the side portions carrying a filter medium which is secured at its sides to the side portions and at its ends to the base portion and extends between the side portions, so as to adopt a U-configuration, with the base of the U-remote from the base portion and facing the flow of fluid medium, when the filter element is removably mounted on the filter mounting plate.

* * * * *